US009148459B2

(12) United States Patent
Rössler et al.

(10) Patent No.: US 9,148,459 B2
(45) Date of Patent: Sep. 29, 2015

(54) METHOD OF HANDLING A GROUP COMMUNICATION IN A COMMUNICATIONS NETWORK AND A COMPUTER SOFTWARE PRODUCT, A NETWORK CLIENT, AND A COMMUNICATION SYSTEM THEREFOR

(75) Inventors: Horst Rössler, Filderstadt (DE); Dieter Kopp, Illingen (DE)

(73) Assignee: Alcatel Lucent, Boulogne-Billancourt (FR)

( * ) Notice: Subject to any disclaimer, the term of this patent is extended or adjusted under 35 U.S.C. 154(b) by 591 days.

(21) Appl. No.: 11/913,316

(22) PCT Filed: Apr. 6, 2006

(86) PCT No.: PCT/EP2006/003129
§ 371 (c)(1),
(2), (4) Date: Nov. 1, 2007

(87) PCT Pub. No.: WO2006/117051
PCT Pub. Date: Nov. 9, 2006

(65) Prior Publication Data
US 2008/0192652 A1  Aug. 14, 2008

(30) Foreign Application Priority Data
May 2, 2005  (EP) ..................................... 05290965

(51) Int. Cl.
*H04L 12/28* (2006.01)
*H04L 29/06* (2006.01)
(Continued)

(52) U.S. Cl.
CPC ........ *H04L 65/4046* (2013.01); *H04L 12/1827* (2013.01); *H04L 65/1006* (2013.01);
(Continued)

(58) Field of Classification Search
CPC ...................................................... H04L 47/70
USPC ................................... 370/255; 455/509, 516
See application file for complete search history.

(56) References Cited

U.S. PATENT DOCUMENTS

2003/0002521 A1* 1/2003 Traversat et al. ............. 370/465
2003/0050083 A1* 3/2003 Metais et al. ................. 455/509

OTHER PUBLICATIONS

J. Ganguly et al, "Theory of Clock Synchronization and Mutual Exclusion in Networked Control Systems" (Online) Aug. 1, 1999.*
(Continued)

*Primary Examiner* — Christopher R Crompton
(74) *Attorney, Agent, or Firm* — Fay Sharpe LLP

(57) ABSTRACT

The application relates to a method of handling a group communication in a communications network, comprising the steps of agreeing and arranging participating clients of a group; establishing a communication session for directed exchanging of streamed media between the participating clients, coordinating communication resources, especially the direction of exchanging of streamed media, i.e. re-assigning a communication resource to a client when this clients has requested this communication resource, where the clients are symmetrically organized as peers in the communication network, i.e. there is no distinguished (centralized) client but a distributed system of peers (P1, P2, P3), where a peer to peer network among the participating clients is established for coordinating the direction of exchanging of streamed media by electing at least one participating peer (P1, P2, P3) of said group of participating peers (P1, P2, P3) as a source peer; and piping the streamed media originated by the at least one participating peer (P1, P2, P3) to the participating peers via the peer to peer network, and coordinating the mutual exclusive communication resources by initiating an election by a request (1'), and resolving the concurrent request (2', 4', 7', 6') fair and alive by a distributed election algorithm between the peers using the peer to peer network. The invention also relates to a computer software product, a network client, and a communication system therefor.

11 Claims, 5 Drawing Sheets

(51) Int. Cl.
*H04L 12/18* (2006.01)
*H04W 4/08* (2009.01)
*H04W 8/18* (2009.01)
*H04L 29/08* (2006.01)
*H04W 4/10* (2009.01)
*H04W 76/00* (2009.01)

(52) U.S. Cl.
CPC ........ *H04L65/4061* (2013.01); *H04L 65/4076* (2013.01); *H04L 67/104* (2013.01); *H04L 67/1051* (2013.01); *H04W 4/08* (2013.01); *H04W 8/186* (2013.01); *H04L 12/189* (2013.01); *H04L 65/1016* (2013.01); *H04W 4/10* (2013.01); *H04W 76/005* (2013.01)

(56) References Cited

OTHER PUBLICATIONS

B. Sanders, "The Information Structure of Distributed Mutual Exclusion Algorithms", ACM Transactions on Computer Systems, vol. 5, No. 3, Aug. 1, 1987, pp. 284-299.*

M. Baker, "Speech Transport for Packet Telephony and Voice over IP", Proceedings of the SPIE Conference on Internet II: Quality of Service and Future Directions, Sep. 1999, pp. 242-251.*

Singhal et al. "A Distributed mutual Exclusion Algorithm for mobile Computing Environments", Intelligent Information Systems, 1997. IIS '97. ; Issue Date: Dec. 8-10, 1997, pp. 557-561.*

J. Ganguly et al, "Theory of Clock Synchronization and Mutual Exclusion in Networked Control Systems" (Online) Aug. 1, 1999, XP00234468.

B. Sanders, "The Information Structure of Distributed Mutual Exclusion Algorithms", ACM Transactions on Computer Systems, vol. 5, No. 3, Aug. 1, 1987, pp. 284-299, XP002344469.

M. Baker, "Speech Transport for Packet Telephony and Voice over IP", Proceedings of the SPIE Conference on Internet II: Quality of Service and Future Directions, Sep. 1999, pp. 242-251, XP002344616.

Open Mobile Alliance: "Push to talk over Cellular (PoC)—Architecture, candidate Version 1.0" (Online), Mar. 17, 2005, XP002344470.

* cited by examiner

METHOD OF HANDLING A GROUP COMMUNICATION IN A COMMUNICATIONS NETWORK AND A COMPUTER SOFTWARE PRODUCT, A NETWORK CLIENT, AND A COMMUNICATION SYSTEM THEREFOR

BACKGROUND OF THE INVENTION

The present invention relates to a method for fault-tolerant, reliable stream processing. The invention also relates to a computer software product, a network client, and a communication system therefor.

SUMMARY OF THE INVENTION

Push to talk (PTT) over a (cellular) network introduces a new real-time direct one-to-one and one-to-many voice communication service in the (cellular) network. The principle of communication behind the service is simple—just push to talk. Thanks to the 'always-on' connection, i.e. a subscriber has typically direct access to the service after the subscription to it without additional measures (such as dial-up) provided that cellular network supports the service, is available and is not overloaded, calls can be started to both individuals and talk groups with just a push of a key. The call connection is almost instantaneous and the receiver does not have to answer the call.

Such a system where a shared channel is controlled by several mobile stations is known from the US-Patent Application Pub. No. 2003/0050083 A1.

Push to talk service users are typically engaged in some other activity than a telephone call, and they listen to the group traffic during their activity. A user can be contacted by the name, or he may occasionally want to say something to the group. Half-duplex traffic is ideal for such use cases.

Push to talk service is a genuine differentiated voice service, because it is not a substitute for any existing cellular services.

A push to talk service could also be an integral part of an IP (Internet Protocol) Multimedia communication service within an IP Multimedia Subsystem (IMS). It could for instance be based on half-duplex Voice over IP (VoIP) technology over mobile networks. Thanks to the IP technology, the push to talk service uses cellular access and radio resources more efficiently than circuit-switched cellular services, reserving network resources only for
the duration of talk spurts instead of for an entire call session.

Implementing and operating PTT is not a simple issue as there are many issues that must be considered and ultimately resolved/managed for optimal success including e.g. voice quality, i.e. the use of IP technology for PTT inherently adds the issue of voice quality of service (QoS), just as QoS is an issue with VoIP on fixed networks, the call-set-up time, i.e. the duration of time from the instance of selecting a user to engage in a PTT session to the time that one is able to initiate a conversation, or the PTT Interoperability.

At the core of PTT is an IETP standardized protocol known as Session Initiation Protocol (SIP) used for IP communications and Wireless Softswitch network infrastructure. Since it uses IP as a transport/bearer, PTT is highly dependent on the roll-out, expansion and improvements of 2.5G and 3G technology and infrastructure. The Open Mobile Alliance (OMA) standardizes the infrastructure and processes supporting push to talk over Cellular (PoC), which is the evolution of PTT from proprietary approaches to a more open approach that would operate uniformly and seamlessly between and among technologies and service providers. OMA is seeking to offer the following infrastructure network elements:

A PoC Server containing server-side logic, providing the following functions: end-point for SIP signaling and voice bursts, handling participant lists distribution, reporting to the charging system, and media distribution.

An IMS Core containing SIP proxies and SIP registers. The Ue accesses the IMS Core for purposes of SIP signaling to the PoC Server. The IMS Core also handles authentication and accounting functions and triggering of personal and group instant talk sessions. A Group/List Manager Server (GLMS) is responsible for management of contact lists, group lists, access lists, and permissions management such as the Do-Not-Disturb. And a user equipment (Ue) is a terminal client equipment (mobile phone) containing the PoC application software.

Hence the current PTT service concepts are based on a central server which causes a very long transmission delay and is not suitable for ad-hoc networks. Besides, even a distributed server cluster might be a bottle neck for communication and coordination.

A direct connect conversation produces a different experience from a regular call. The push-to-talk feature tends to discourage people from rambling.

Current systems take 10 to 15 seconds after pushing the button to establish a connection, for something that should happen almost instantaneously. More annoying, there is a delay of at least five seconds after speaking before the person at the other end hears what is said. The result is a painful pause each time one person finishes speaking.

This problem is overcome by a method of handling a group communication in a communications network, where participating clients are agreed and arranged as a group; where a communication session for directed exchanging of streamed media between the participating clients is established, and where the communication resources are coordinated, especially resources like the direction of exchanging of streamed media, i.e. re-assigning a communication resource to a client when this clients has requested this communication resource, in such a way that the clients are symmetrically organized as peers in the communication network, i.e. there is no distinguished (centralized) client but a distributed system of equivalent peers, where a peer to peer network among the participating clients is established for coordinating the direction of exchanging of streamed media by electing at least one participating peer of said group of participating peers as for dispatching the requested resource; and exchanging the streamed media originated by the at least one participating peer to the participating peers via the peer to peer network, and coordinating resource requests by initiating a election and resolving the concurrent request fair and alive by a distributed election algorithm between the peers using the peer to peer network. The problem is solved inter alia by a computer software product, a network client, and a communication system therefor, carrying out the method.

This has the advantage that the system becomes scalable and does not suffer from big delays. Furthermore the invention is suitable for ad hoc networks.

And it has the advantage that the reliability and the fault-tolerance of the communication system is enhanced.

Besides, the robust and scalable peer to peer architecture has the advantage that it economizes the use of resources, reduces latencies, and avoids centralized (bottleneck) servers.

DESCRIPTION OF THE DRAWINGS

The invention is explained in the following in detail using the figures, where.

DETAILED DESCRIPTION

Figure 1:
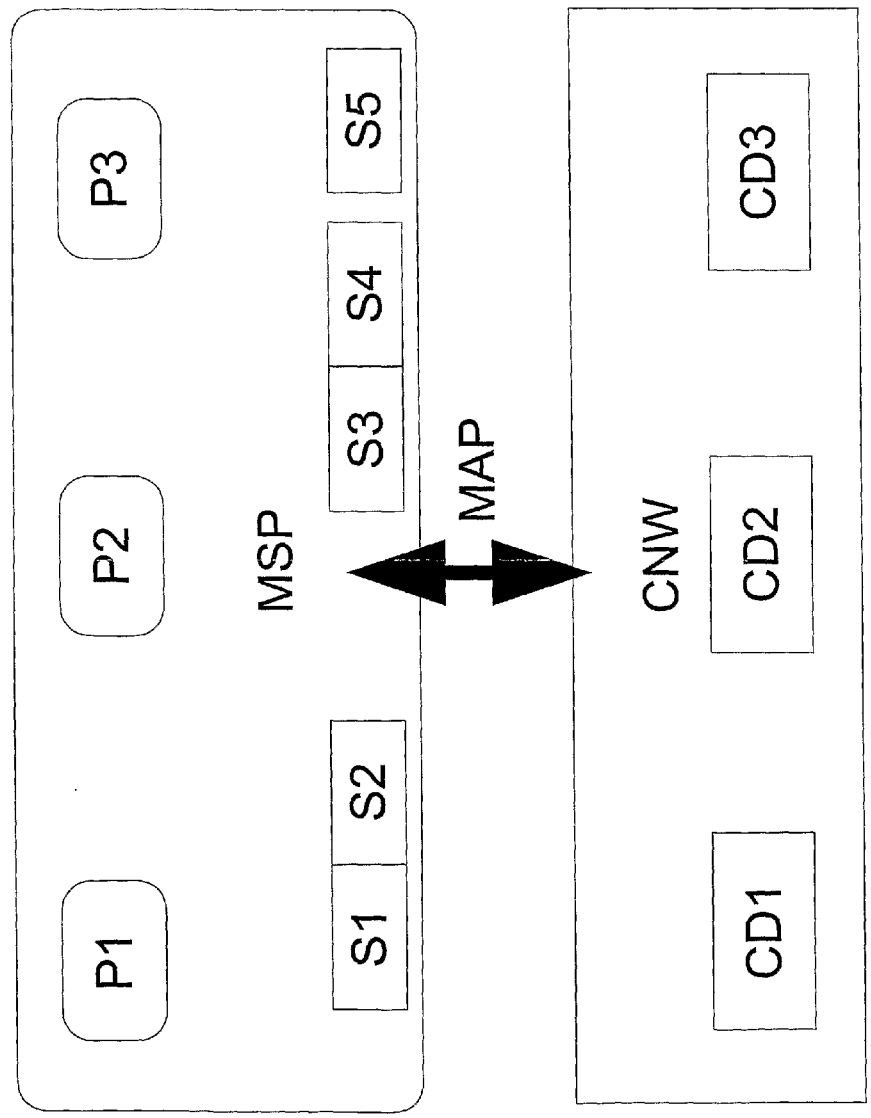
FIG. 1 shows the need of a conceptual mapping of information structure onto hardware.

FIG. 1 shows the mapping MAP between entities in the information structure MSP, sometimes called management system platform, and a communication network hardware CNW comprising client devices CD1, CD2, and CD3. The information structure MSP comprises (virtual) entities P1, P2, P3, e.g. Information objects or processes and a set of services S1, . . . , S5 that could be invoked by the entities.

Figure 2:
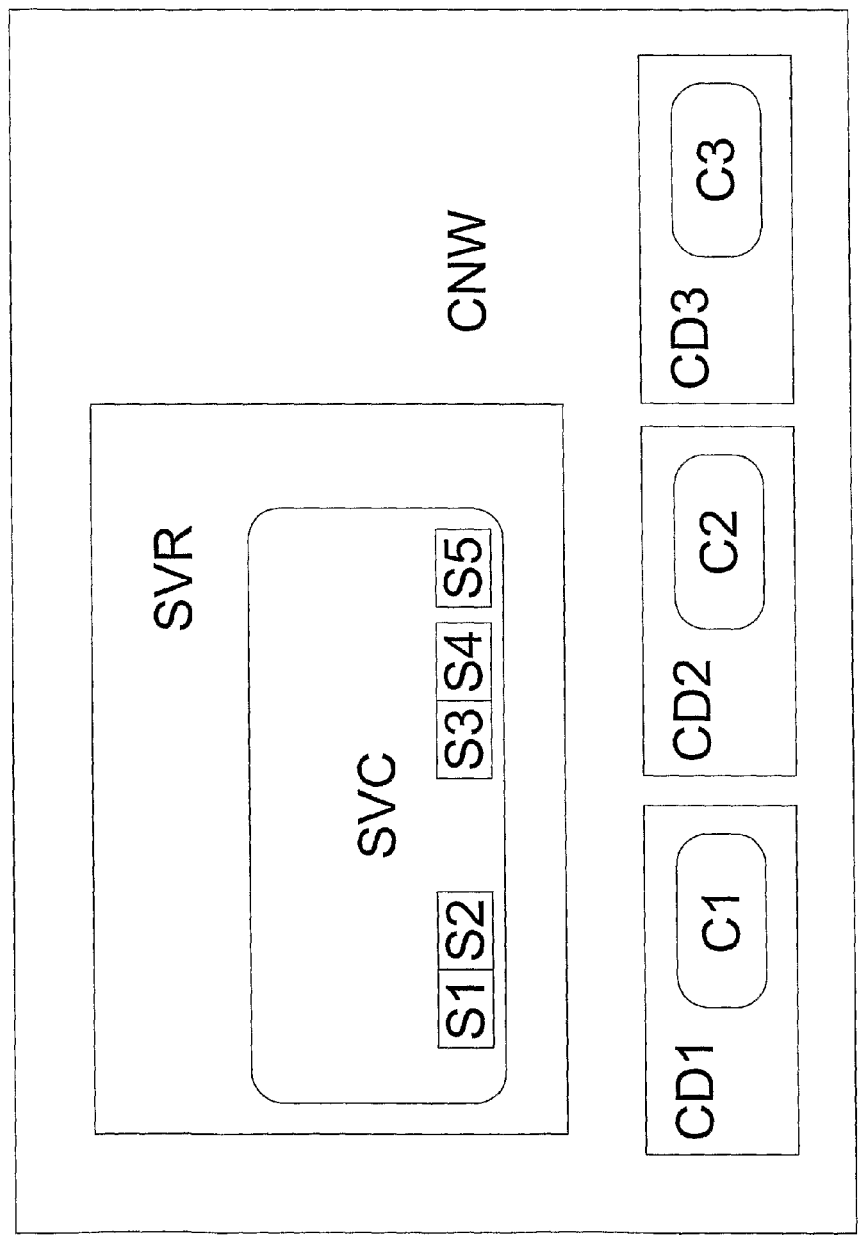
FIG. 2 shows a communication system realized with a client server architecture according to the prior art

FIG. 2 shows the commonly applied client server paradigma, or to be more precise the topology of a client server architecture, thus specifying the mapping MAP.

A server SRV comprises a service component SVC providing the services S1, . . . , S5. This server SVR is a part of the communication network hardware CNW. Each client device CD1, CD2, and CD3 comprises a piece of software, called client C1, C2, C3, for carrying the information of the respective information object P1, P2, and P3.

Figure 3:
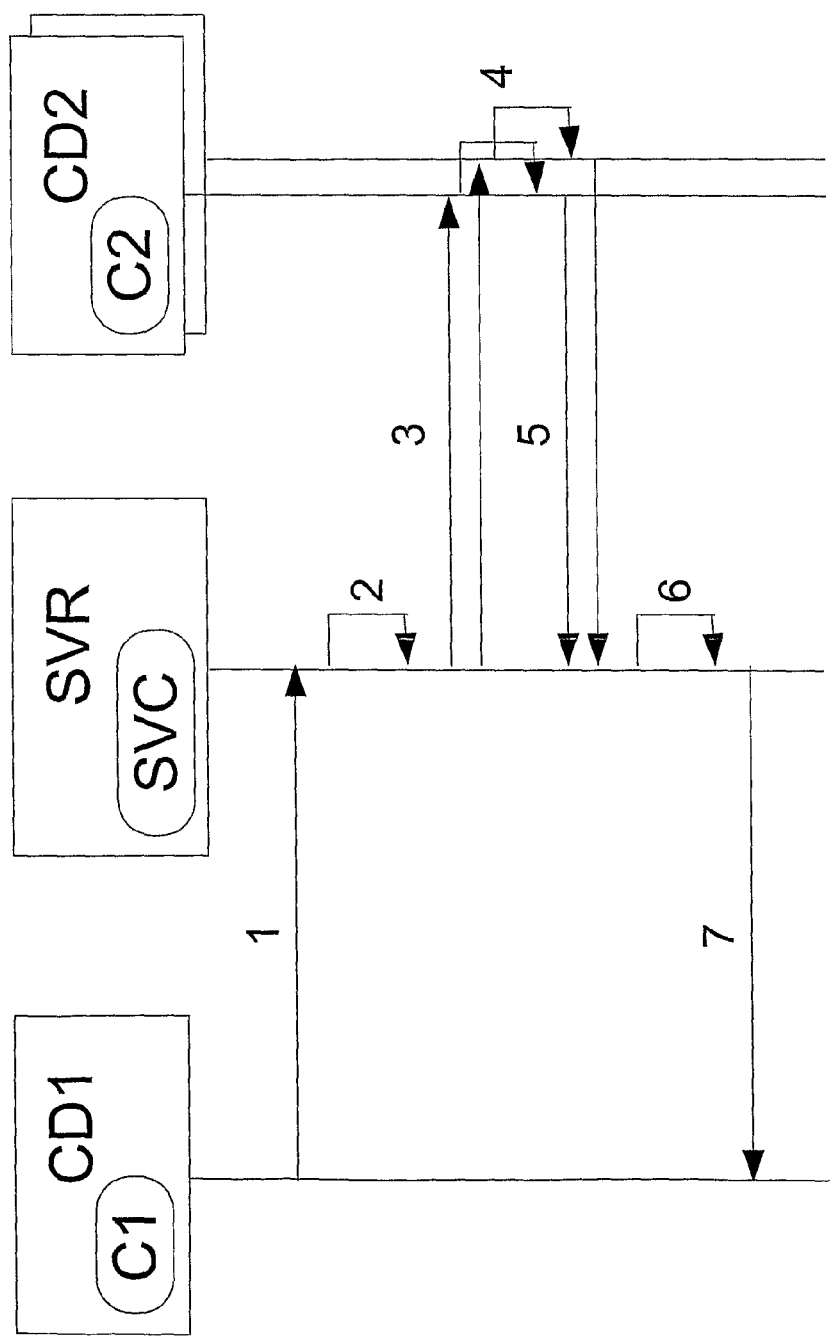
FIG. 3 shows a sequence chart showing the interactions of the client server architecture according to the prior art.

FIG. 3 shows the interaction between the hard- and software components. A client C1 of a client device CD1 could invoke a service of the service component SVC at the server SVR via the communication network by requesting 1 a mutual exclusive communication resource. The service component decides 2 which client has to be informed, and informs 3 the clients C2, . . . in the corresponding client device CD2, . . . via the communication network. The informed clients C2, . . . update 4 their views, if necessary release the communication resource, and acknowledge 5 the release. Eventually, the service component updates 6 its status and if the requested resource is available grants 7 the requested resource to the first mentioned client C1.

Figure 4:
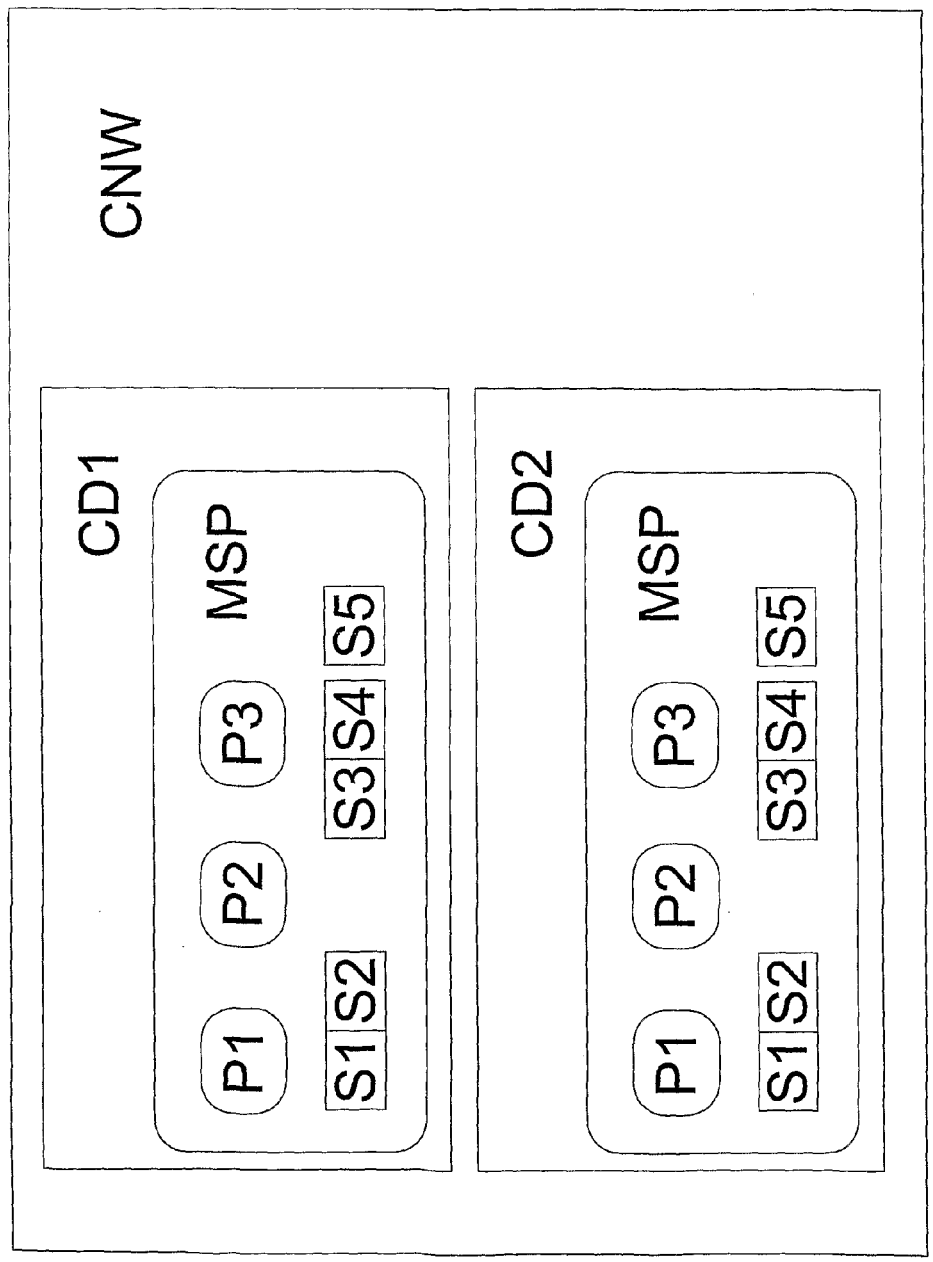
FIG. 4 shows a communication system realized with a peer to peer architecture according to the invention.

This has the aforementioned disadvantages. Therefore in FIG. 4 an alternative mapping MAP is developed, where each client device CD1, CD2 comprises symmetrical management service infrastructure. Thus each of the client devices has its own information structure MSP capable of creating a (virtual) network view meaning it is aware of other information structures located at another client device CD2.

In the following this view comprising virtual entites P1, P2, P3 is called peer to peer network and the entities are called peers. A peer to peer infrastructure is commonly known as P2P. This is a class of applications that takes advantage of resources (storage, cycles, content, human presence) available at the edges of the network. In P2P architecture, peers communicate directly among themselves and can act as both clients and servers, assuming whatever role is most efficient for the network. Peer systems leverage a service oriented architecture (SOA). But the determination of who is a provider, a consumer or a registrar is very loose.

Peer-to-peer technologies are used to facilitate real-time communication and collaboration across distributed networks. In the peer to peer model, without using servers, each client called peer can exchange data, share resources, locate other peers or users, communicate, or collaborate directly in real time. By using peer to peer technologies, applications that coordinate the use of computer CPU cycles and storage can share resources among small or large groups of computers connected to a network like the Internet.

A PTT service with reduced bandwidth requirements on a scalable P2P architecture may save significant resources for service providers and may imply user based control over bandwidth consumption. The information structure could be downloadable, e.g. a PTT client for a cellular phone.

Even if the PTT client itself is not standardized, a more or less standardized method for downloading the client onto the mobile phone will be of great use for those that seek to try PTT very easily (no need to go to the mobile phone store), rapidly accelerating the adoption of PTT. Especially PTT services based on the P2P architecture may economize the use of resources and bandwidth and will run on any packet-based IP network including CDMA, GPRS, UMTS, 802.11x, and wireline. The Internet Protocol (multimedia subsystem) (IMS) could be used as a medium for communication for machines that share balanced resources among each other.

Each user will handle his own buddy list. To check the availability (presence) of a participant, a resolution mechanism is known, which includes the knowledge about the participants by investigation and exploration. Once a communication community group is established a directed (logical) network for streamed communication (voice) has to be established. In case multiple persons are addressed, either a multicast may be used or the messages are sequentially transmitted. An efficient election algorithm ensures the push to talk feature by deriving the orientation of the network.

Indeed, the original Internet was fundamentally designed as a peer to peer system. Over time it has become increasingly client/server, with millions of consumer clients communicating with a set of servers. The current peer to peer applications are using the Internet much as it was originally designed: as a medium for communication for machines that share resources with each other as equals.

To check the availability (presence) of a participant, a simple session initialization protocol (SIP) procedure, for example using Invite and Acknowledge may be used to update the buddy list on availability (presence, preferences) or not. This includes also the knowledge on the participant's SIP address.

A message may be pushed to the defined participation with direct RTP/UTP voice packages. In case multiple person are addressed, either a multicast protocol may be used or the messages are sequentially transmitted. Clients may be downloadable onto handsets, smartphones, PDAs or desktops and assure being compliant with SIP, RTP; UDP; SIMPLE, and 3GPP standards.

Peer to peer technology could be viewed as a set of protocols. Each protocol is defined by one or more messages exchanged among participants in the protocol; each message has a predefined format, and may include various data fields.

The following six protocols are basically: Peer Discovery Protocol, Peer Resolver Protocol, Peer Information Protocol, Peer Membership Protocol, Pipe Binding Protocol, Endpoint Routing Protocol.

A peer is any entity that can speak the protocols required of a peer. This is akin to the Internet, where an Internet node is any entity that can speak the suite of IP protocols. As such, a peer can manifest itself in the form of a processor, process, machine, or user. Messages are designed to be usable on top of asynchronous, unreliable, and unidirectional transport.

Therefore, a message is designed as a datagram, containing an envelope and a stack of protocol headers with bodies. The envelope contains a header, a message digest, (optionally) the source endpoint, and the destination endpoint. An endpoint is a logical destination, given in the form of a URI, on any networking transport capable of sending and receiving datagram-style messages.

A peer group is a virtual entity that speaks the set of peer group protocols. Typically, a peer group is a collection of cooperating peers providing a common set of services.

Pipes are communication channels for sending and receiving messages, and they are asynchronous. They are also unidirectional, so there are input pipes and output pipes. Pipes are also virtual, in that a pipe's endpoint can be bound to one or more peer endpoints. A pipe is usually dynamically bound to a peer at runtime via the Pipe Binding Protocol. This also implies that a pipe can be moved around and bound to different peers at different times.

The pipes could serve the intercommunication channel, i.e. a communication resource, between the aforementioned exemplary push to talk peers, while the synchronization of a channel request needs to assure mutual exclusion of transmitting. This means there is only one sender and multiple receivers at any life time of a system. This requires a certain synchronization, e.g. a simple distributed priority Lamport Algorithm or a more (probably the most) efficient one, described in the following.

Existing mutual exclusion algorithms distributed systems are not suitable for such systems. A concept of "look-ahead" technique for distributed mutual exclusion which instead of enforcing mutual exclusion among all the peers of a system, enforces mutual exclusion only among the sites which are concurrently competing for critical section, resulting in less message overhead. It first looks to find out the sites that are currently requesting a critical section before sending out request messages. Designing look-ahead mutual exclusion involves two issues: First, to identify sites which are concurrently competing for a critical section (like a push request), and second, to enforce mutual exclusion among these sites.

Figure 5:
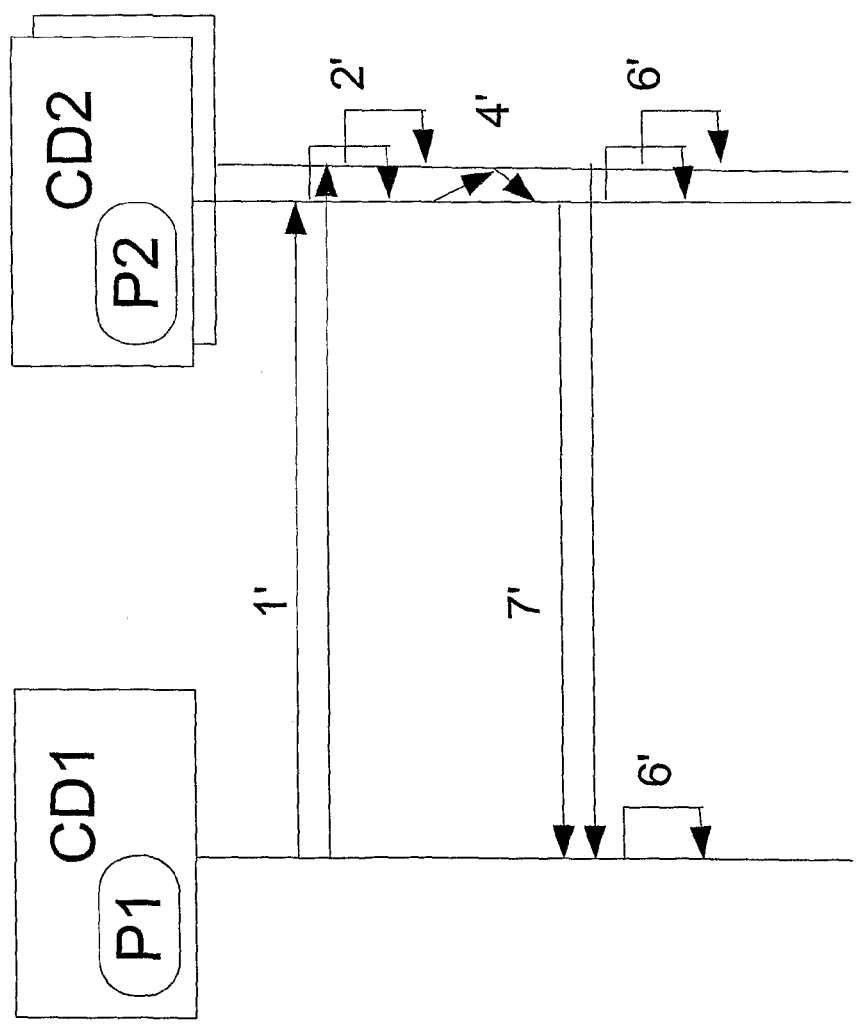
FIG. 5 shows a sequence chart showing the interactions of the peer to peer architecture according to the invention.

This is shown in the sequence chart of FIG. 5. A first peer P1 at a client device CD1 requests 1' a mutual exclusive resource. This request is distributed among the other peers and each involved peer contributes 2', 4' to the synchronization of the resource, that is eventually granted 7' to the first peer P1. Each peer P1, P2, . . . itself maintains 6' its system view. An efficient election algorithm is described in detail.

A distributed application consists of a collection of processes, the peers, executing on a set of computers in a system such that one or more processes may be executing on any single site. The sites do not share any memory and communicate completely by message passing. Message propagation delay is finite but usually unpredictable. In a peer to peer environment one can assume that the underlying communication medium is reliable and sites do not crash.

Over the last decade, the problem of mutual exclusion in distributed systems has received considerable attention and several algorithms to achieve mutual exclusion in distributed systems have been proposed, see e.g. "Theory of Clock Synchronized and Mutual Exclusion in Networked Control Systems", Technical Report of the ISIS Group at the University of Notre Dame, of Joydeep Ganguly and Michael D. Lemmon. There also a survey of approaches and notions could be found.

Simpler algorithms, like the token based, are generally inefficient because sites which are not competing for are also sent request messages. So, such algorithms are not suitable for computing systems consuming low bandwidth and having high real time requirements. The most suitable for election in the context for a peer to peer application seems to be the Non-Token algorithms, see section 5.2 of the cited document, like the Lamport Algorithm or the Ricart-Ageawala Algorithm.

For increased efficiency an improved distributed mutual exclusion algorithm is proposed, where when a peer wants to execute a critical section, it is not required to get permission from all the peers but only a subset of peers, thus resulting in low message overhead. Therefore a concept of look-ahead for distributed mutual exclusion where instead of enforcing mutual exclusion among all peers, mutual exclusion is enforced only among the peers which are concurrently competing for a critical section. We term it "look-ahead" technique because it first looks to find out which sites are currently requesting before sending out request messages. A peer needs only to consult peers competing for the critical section.

There are two advantages to look-ahead mutual exclusion: (i) Look-ahead mutual exclusion algorithms are more efficient because they eliminate unnecessary communication among sites. Message traffic is proportional to the average number of active sites at any time (not necessarily to the total number of sites). Also, non-requesting sites do not have overhead of processing request messages from requesting sites. (ii) Theoretically, look-ahead mutual exclusion algorithms introduce another dimension to dynamic distributed algorithms.

Assume for each peer a concurrency set being the set of peers which are concurrently invoking mutual exclusion with this peer. This requires identifying peers which are concurrently competing with a peer and in a second step enforcing mutual exclusion among concurrently competing sites.

A major challenge in the design of look-ahead mutual exclusion algorithms is to identify the concurrency set of a requesting site without exchanging excessive messages.

In a first step concurrency sets are identified: A site finds out what peers are currently competing. There are at least three ways to do this: Centrally: A central server keeps the latest state of every site. Sites inform the central site of their state changes. This method is not a distributed solution to the mutual exclusion and hence is not efficient. Snoopy: This method is applicable only to the systems which have broadcast type communication medium. A site learns about the state of other sites by monitoring the message transfer activity on the communication medium. This method has little overhead but is limited to systems with broadcast communication architecture. Distributed: In this method, a peer sends messages to other peers to inform them of its status. Once again there are at least two ways to do this: A peer can inform every other site about its status changes or a peer can probe the status of other peers whenever it decides to execute the critical section. However, these methods are expensive—they require at least 2*(#peers−1) messages. One can reduce the message traffic due to state information dissemination/acquisition by half using the following observation: If I informs J of its request status, then J automatically gets informed whenever I requests. Thus, there is no need for J to explicitly request status information from I.

Let the peers be 1, 2, 3, . . . n, and info I the set of the peers to which I informs that it is requesting. Further let state I the set of the peers which inform I that they are requesting.

Condition 1: Construction of the Sets

I. for all peers I: Info_I U state_I=all peers

II. for all peers I and J: I in info_J then J in state I

Clearly, the sufficient condition for a peer I to know the request activity in the entire system requires that I should either inform every J of its status or should get informed by J of its status.

For minimality of the sets state_I and info_I are disjoint. Otherwise, there would be redundancy in the information exchange, i.e. I informs a J as well as it gets informed by J. The conditions state how the sets in the system are initialized. Any initialization of these sets which satisfies the condition is fine.

If the sufficiency condition holds, it has the consequence that for every pair of peers I and J either I is in info_J or J is in info I.

A site I learns about other concurrently requesting sites in two ways: (i) If J in state_I then J will inform I by itself. (ii) If J in info.), then I will inform J which in turn will inform I if it is currently requesting. Formally this results in Condition 2: Handling Requests When I receives a request message from J, it sends a request message to J provided I itself is requesting at that time and J in state_I. I.e. it deletes J from state_I and adds J to info I.

Therefore, when a peer I learns that another peer I is requesting, it adds entry J to info_I. If I is also requesting at that time, then it sends a request message to J (if not sent already). Handling requests in this manner enables a requesting peer to learn what other sites are concurrently requesting, which is expressed in the following: If all sites follow Condition 1 and 2, then a site eventually learns about all the sites concurrently requesting. Only the sites in info_I can be concurrently requesting with I.

Let the resolution of an info set be the fraction of peers in info_x which are actually requesting concurrently with the corresponding site. A peer must request permission from all the sites which are requesting the critical section concurrently with it. However, if it also requests permission from few sites which are not requesting concurrently, it does not affect the correctness; It only affects the performance.

Once a site knows all the sites which are concurrently requesting, it can use for instance the Ricart-Agrawala method or any other exclusion algorithm on those peers to enforce mutual exclusion.

When a site I receives a request, it sends a reply message in response to it, if it is not requesting or if the priority of its request is lower than that of the incoming request. Otherwise, it defers the reply. A site enters the critical section only after it has received a reply message from every other site.

Note that first sending a message to peers in an info set to inquire their status, and then sending request messages only to those sites which are actually requesting, would be expensive (results in a large message traffic and large delays). Thus, it will be more desirable that a peer sends request messages to all sites in its info set in the first place. Only the peers in this info set can be concurrently requesting. Therefore, to request, a peer sends requests to all peers in its info set. Note that a peer incrementally adds entries as it gradually learns about their requests (Condition 2). Therefore, a site incrementally sends request to peers as it receives requests from them and adds them in its state set (Condition 2).

Condition 3: Handling Requests

A site I sends a reply in response to a request if it is not requesting or if the priority of its request is lower than that of the incoming request.

Condition 2 and 3 both deal with handling requests. Condition 2, which states how to update sets, is generic to the look-ahead approach; whereas Condition 3 is specific to Ricart-Agrawala algorithm to enforce mutual exclusion.

Condition 4: Execution of Critical Section

A site I executes the critical section only after it has received a reply message for every request it sent out.

Due to continued application of Condition 2, the size of the info sets increase monotonically and thus, the resolution decreases. If I receives a reply from J then at that instant I is in info J and J is in info I.

Therefore, when such a situation occurs either site I should delete J from info_I or vice-versa. Note that if I deletes J from info_I, then mutual exclusion may not be guaranteed. Thus, the only choice is that J should delete I from info_J (and place it in status_J) to meet Condition 1. Note further that I can perform these operations when it receives a reply message from J.

Condition 5: Handling Reply Messages

After a site I has received a Reply from J, it deletes the entry of J, from info_I and places it in state_I.

As a consequence: if J is in info_I, just before I executes the critical section, then I is in info_J after I has executed the critical section. After the peer I has finished executing, all entries in info_I correspond to peers having a pending request.

Therefore, after having finished execution, a peer should send a reply to all sites in its info set.

Condition 6: Exiting the Critical Section

On exiting, a peer I sends replies to all peers in info_I.

The invariant on the peers' information is preserved by the execution. And the actions taken in Condition 2 to 6 preserve Condition 1. This algorithm has several advantages. It is correct, i.e. it preserves mutual exclusion, it is free from dead locks and free of starvation. And the most important it is highly performant due to the substantial reduction in message traffic.

The invention claimed is:

1. A method of handling a group communication in an ad hoc communications network, the method being executed by a plurality of client devices in the communication network, comprising:
   agreeing and arranging participating peer devices of a group;
   establishing a communication session for directed exchanging of streamed media between the participating peer devices,
   coordinating communication resources, comprising the direction of exchanging of streamed media, by re-assigning a communication resource to a peer device having requested this communication resource,
   wherein the peer devices are symmetrically organized as peers in the ad hoc communication network, where a virtual peer to peer network among the participating peer devices is established, without a centralized server, for coordinating the direction of exchanging of streamed media by:
      identifying a subset of the participating peer devices as requesting peer devices, wherein the requesting peers comprise at least two peers, each of which is concurrently requesting access to the communication resources;
      electing, via an election algorithm, at least one participating peer device of said subset of participating peer devices as a source peer device for guaranteeing exclusive access to the communication resources for use in sending via a distributed mutual exclusion algorithm that is free from deadlocks and free from starvation; and
      using a pipe for sending the streamed media originated by the at least one participating peer device to the participating devices via the peer to peer network.

2. The method according to claim 1, wherein the resource is a push to talk service providing the capability of sending the streamed media to other participating peer devices.

3. The method according to claim 1, wherein the election algorithm is Lamports's Algorithm.

4. The method according to claim 1, wherein the election algorithm is an Information Structure based Algorithm.

5. The method according to claim 1, wherein the request is triggered by an injection of streamed media of one of said participating peer devices and delayed until the request is accepted.

6. The method according to claim 5, wherein the injection of streamed media is speech, detected by a speech detection, such that the election ensures a unique resource allocation to one of said participating peer devices.

7. A peer device having stored thereon a computer software product for handling a group communication in a communications network, comprising a processor configured to carry out the method according to claim 1.

8. A communication system, comprising multiple network peer devices according to claim 7.

9. The method according to claim 1, wherein the distributed mutual exclusion algorithm is a look-ahead mutual exclusion algorithm.

10. The method according to claim 3, wherein the election algorithm is a Lamports's Algorithm comprising a Ricart-Agrawala optimization.

11. The method according to claim 4, wherein the Information Structure based Algorithm is a Sanders Algorithm.

* * * * *